United States Patent [19]

Isobe et al.

[11] Patent Number: 5,634,396

[45] Date of Patent: Jun. 3, 1997

[54] APPARATUS FOR FORMING SUSHI ROLLS

[76] Inventors: Gary S. Isobe, 5103A Palaole Pl., Honolulu, Hi. 96821; Glenn T. Saito, 98-826 Leialii St., Aiea, Hi. 96701

[21] Appl. No.: 570,659

[22] Filed: Dec. 11, 1995

[51] Int. Cl.⁶ .................................. A21C 9/00; A23P 1/00
[52] U.S. Cl. .................. 99/450.6; 99/450.1; 99/450.7; 99/353; 131/47; 131/51
[58] Field of Search ................. 99/494, 450.1–450.6; 118/21; 426/502; 425/110, 319, 383, 436 R, 112, 308; 53/215, 216, 390; 248/311.2, 346.01; 131/47, 51, 53

[56] References Cited

U.S. PATENT DOCUMENTS

| | | | |
|---|---|---|---|
| 2,415,910 | 2/1947 | Roes | 131/47 |
| 2,436,015 | 2/1948 | Morris | 131/47 |
| 2,525,986 | 10/1950 | White | 99/450.1 |
| 3,911,933 | 10/1975 | Crisp et al. | 131/51 X |
| 4,047,478 | 9/1977 | Trostmann et al. | 99/450.1 |
| 4,637,304 | 1/1987 | Suzuki | 99/450.2 |
| 4,674,967 | 6/1987 | Oseka | 425/110 |
| 4,953,455 | 9/1990 | Figueras et al. | 99/450.6 |
| 5,381,728 | 1/1995 | Tateno | 99/450.1 |

FOREIGN PATENT DOCUMENTS

| | | | |
|---|---|---|---|
| 466895 | 6/1937 | United Kingdom | 131/47 |

*Primary Examiner*—Timothy F. Simone
*Attorney, Agent, or Firm*—Michael I. Kroll

[57] ABSTRACT

An apparatus (20) for forming sushi rolls (14) comprising a housing (22). A drive roller (24) is rotatively carried within the housing (22). A driven roller (26) is rotatively carried within the housing (22) in a side by side relationship with the drive roller (24). An endless belt (28) is between the drive roller (22) and the driven roller (26). The endless belt (28) has an arcuate recess portion therebetween that will receive a food filler (16) deposited upon the arcuate recess portion. A facility (30) in the housing (22) is for positioning the driven roller (26) closer to the drive roller (24) after the food filler (16) is placed upon the arcuate recess portion of the endless belt (28). A component (32) is for rotating the drive roller (24) with the endless belt and the driver roller (26) together. When an edge of a seaweed sheet (18) is inserted into the arcuate recess portion of the endless belt (26), the seaweed sheet (18) will tightly wrap about the food filler (16) to form a sushi roll (14).

3 Claims, 4 Drawing Sheets

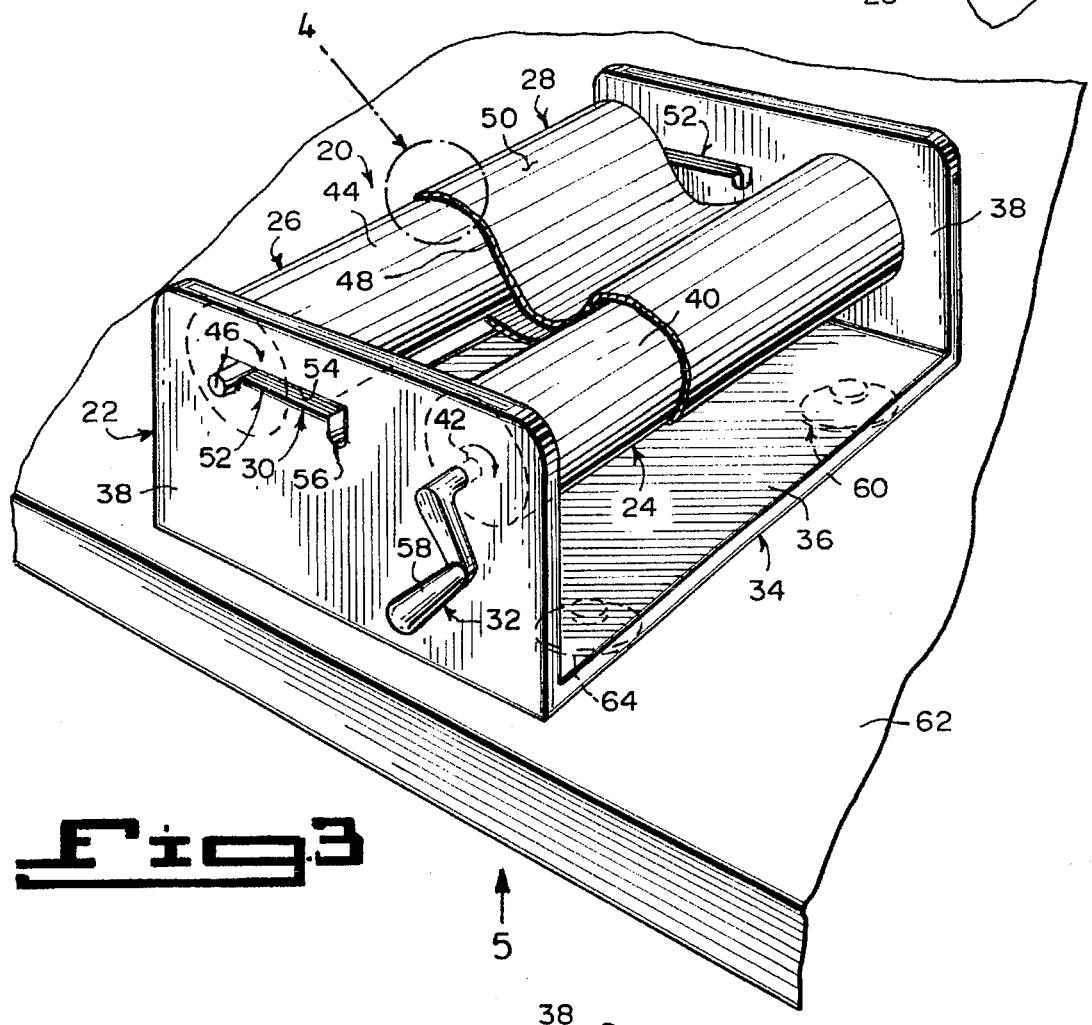

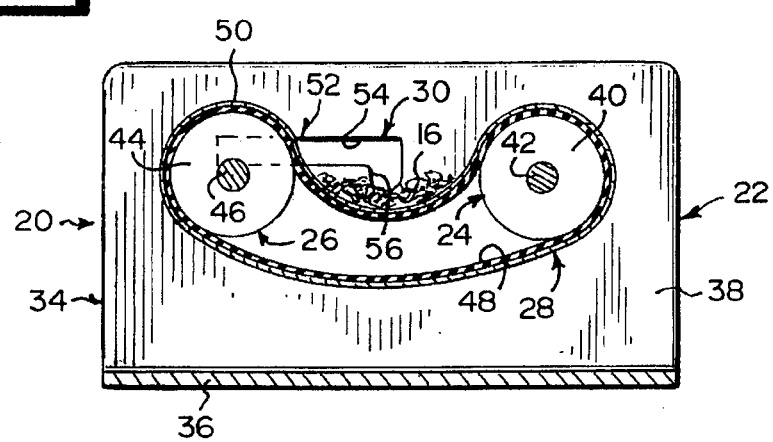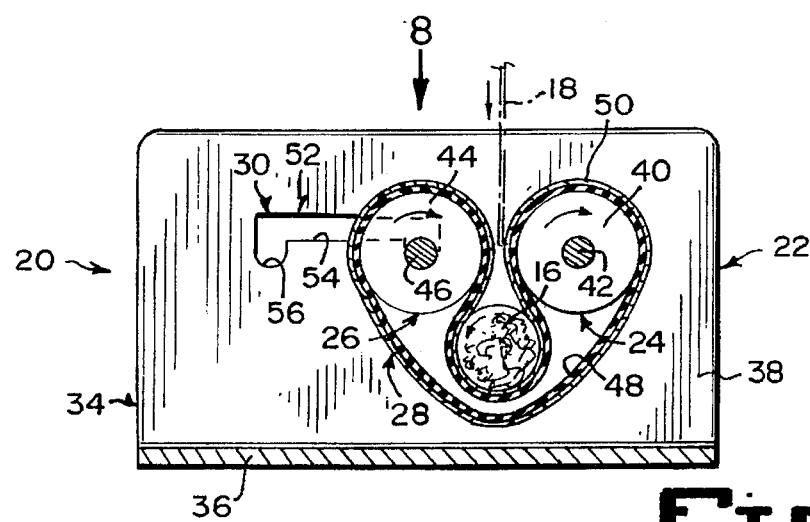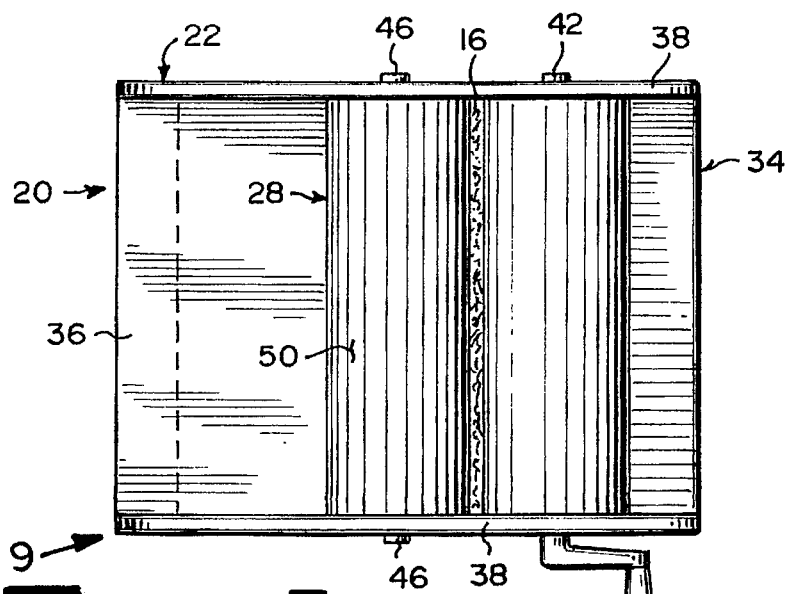

APPARATUS FOR FORMING SUSHI ROLLS

BACKGROUND OF THE INVENTION

1. Field of the Invention

The instant invention relates generally to food product preparation devices and more specifically it relates to an apparatus for forming sushi rolls.

2. Description of the Prior Art

Numerous food product preparation devices have been provided in prior art. For example, U.S. Pat. Nos. 2,525,986 to White; 4,047,478 to Trostmann et al.; 4,674,967 to Oseka and 5,381,728 to Tateno all are illustrative of such prior art. While these units may be suitable for the particular purpose to which they address, they would not be as suitable for the purposes of the present invention as heretofore described.

WHITE, PERCY

MACHINE FOR COATING OF ARTICLES

U.S. Pat. No. 2,525,986

A machine for applying a layer of plastic material to an article, comprising in combination a hollow rotary cylinder having openings extending through the thickness of the wall of the cylinder to form a rotary stencil plate. A means is to compress material fed from the interior of the cylinder into its stencil opening. A scraper is to remove excess material adhering to the outer wall and to the inner wall of the cylinder as it is displaced relatively to them. An air nozzle is disposed in operative succession to the scraper to progressively eject wads of plastic material confined within the openings from one side to the other of the openings, while the progressively diminishing part of the wads is retained in the stencil openings by the scrapers.

TROSTMANN, ERICK

ALBERTSON, OVE

APPARATUS FOR THE PRODUCTION OF ROLLED FOOD PRODUCTS

U.S. Pat. No. 4,047,478

An apparatus for the production of Chinese spring rolls and other rolled food products. A flat pancake is deposited on a gas permeable conveyor belt and a filler substance is placed atop the pancake. The pancake successively is passed above air jets directed against the underside of the pancake to fold the front portion and opposite side portions of the flat pancake over the filler substance. The folded pancake together with the filler substance finally is rolled toward the rear edge of the pancake to form a roll fully enclosing the filler substance.

OSEEA, JOHN A.

APPARATUS FOR FORMING ROLLED FOOD PRODUCTS

U.S. Pat. No. 4,674,967

An apparatus for forming rolled food products includes a pair of end members in generally spaced parallel relation. The end members each include an arcuate recess with a support member maintaining the end members in fixed relation to one another. The support member may include a plurality of support rods or a pair of support walls or even a planer base portion. Alternatively, the apparatus may be formed with a continuous curvilinear surface defining an arcuate recess. The method includes placing a first flexible mat in the apparatus, placing a second sheet on the mat, and filling a receiving cavity with food stuff. The assembly is thereafter rolled in the arcuate recess to form a sushi roll or other rolled food product.

TATENO, CHIKARA R.

APPARATUS FOR THE PREPARATION OF SUSHI PRODUCTS

U.S. Pat. No. 5,381,728

An apparatus for the production of sushi and sushi products comprises a housing member and a first pair of contiguous cylindrical rotatable drums. A second pair of contiguous cylindrical rotatable drums are mounted to the housing member and are operably engageable with one another. A sheet forming drum is operably engaged to the first and the second pair of contiguous cylindrical rotatable drums. A plurality of rollers are positioned transversely to the sheet forming drum and are in operable contact with the sheet forming drum. A plurality of flanges are secured to the housing member and project adjacent to the sheet forming drum allowing for removal and transfer of nori and rice from the sheet forming drum. A first and second hopper are secured to the housing member for holding and feeding food particles and articles to the drums. The rotation of the drums may be powered and controlled by a motor, or alternatively by a hand-operated crank arm.

SUMMARY OF THE INVENTION

A primary object of the present invention is to provide an apparatus for forming sushi rolls that will overcome the shortcomings of the prior art devices.

Another object is to provide an apparatus for forming sushi rolls that will help an unskilled person in making the sushi rolls by a simple operation of the apparatus.

An additional object is to provide an apparatus for forming sushi rolls that is fabricated out of a housing supporting a pair of juxtaposed rollers between an endless belt having an arcuate recess that will roll up a seaweed sheet about a food filling to form each sushi roll.

A further object is to provide an apparatus for forming sushi rolls that is simple and easy to use.

A still further object is to provide an apparatus for forming sushi rolls that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a top perspective view of the instant invention on a horizontal support member with the endless belt broken away and in section.

FIG. 4 is an enlarged perspective view as indicated by arrow 4 in FIG. 3, showing the construction of the endless belt in greater detail.

FIG. 5 is a bottom perspective view of the instant invention per se taken in the direction of arrow 5 in FIG. 3.

FIG. 6 is a cross sectional view taken along line 6—6 in FIG. 5, showing the food filler deposited upon the arcuate recess on the endless belt that is in an open position.

FIG. 7 is a cross sectional view similar to FIG. 6, showing the seaweed sheet in phantom being inserted to extend about the rolled up food filler on the endless belt that is in the closed position.

FIG. 8 is a complete top view taken in the direction of arrow 8 in FIG. 7.

Similar reference characters denote corresponding features consistently throughout the attached drawings.

DETAILED DESCRIPTION OF THE PREFERRED EMBODIMENTS

Figure 1:
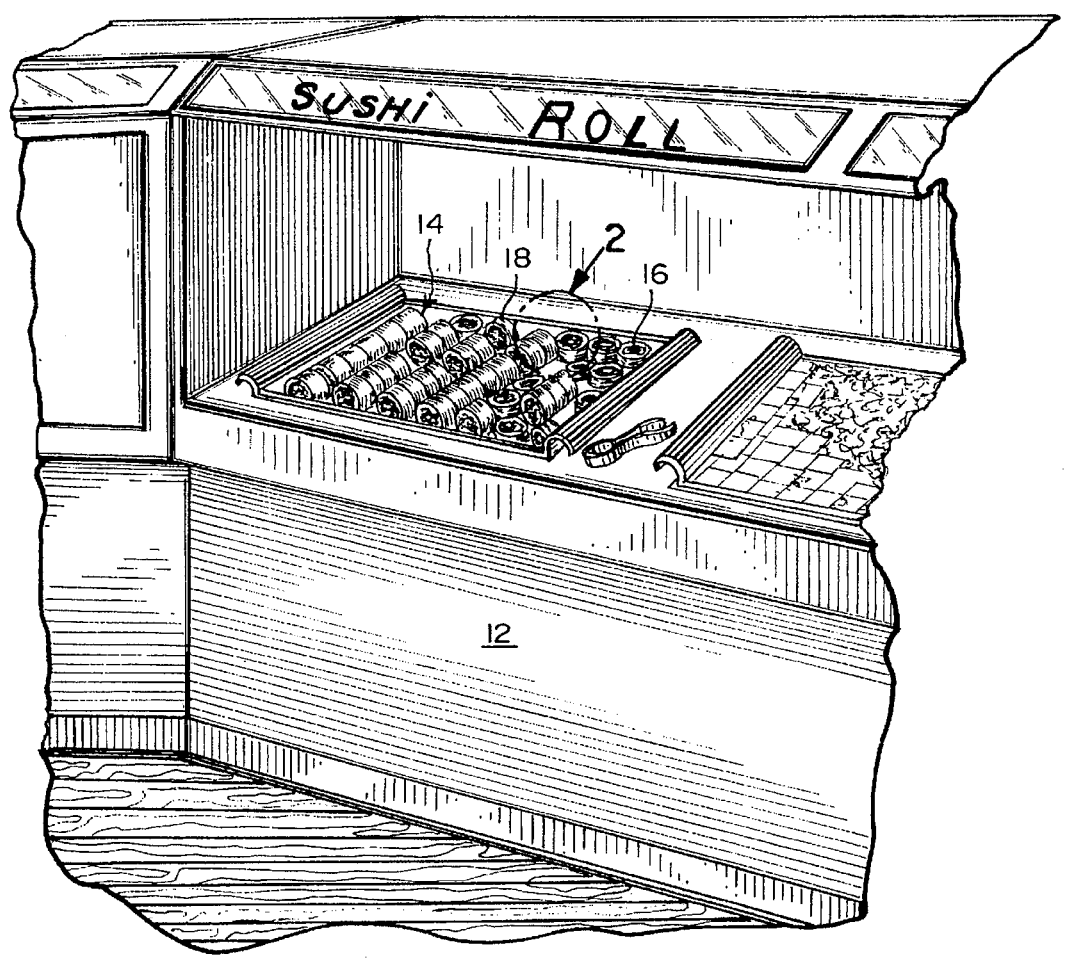
FIG. 1 is a perspective view of a display stand with cut up sushi rolls therein.
Figure 2:
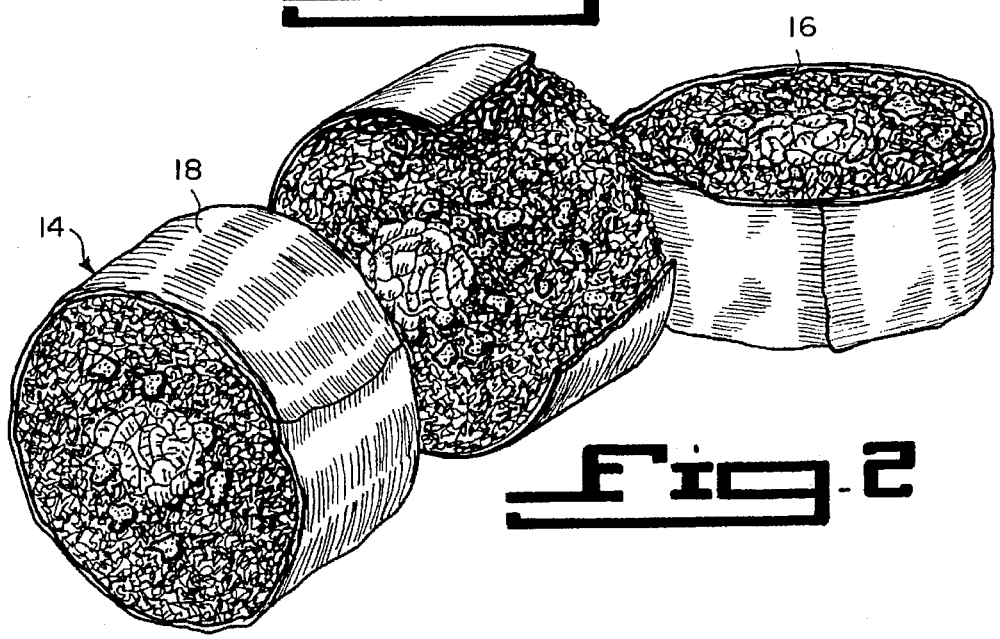
FIG. 2 is an enlarged perspective view as indicated by arrow 2 in FIG. 1, showing the cut up sushi rolls in greater detail.
Figure 9:
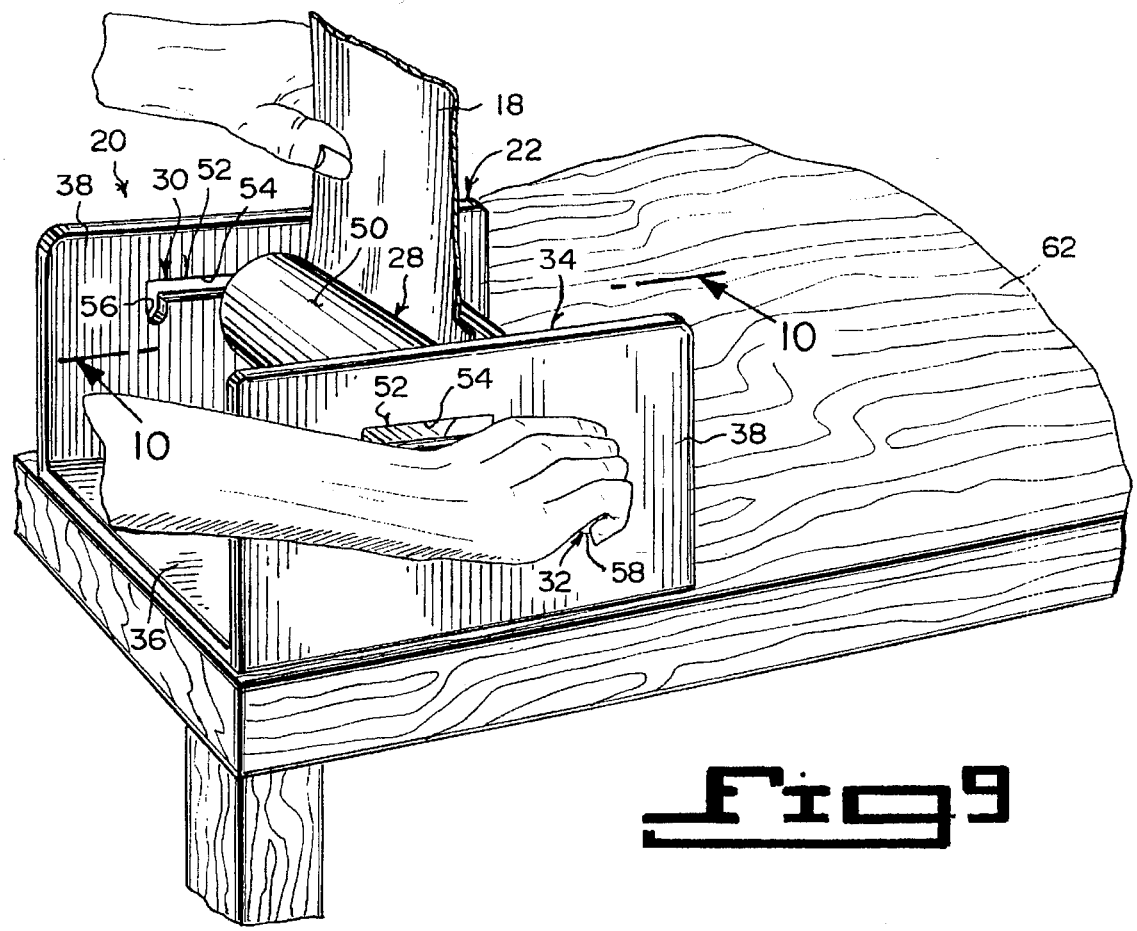
FIG. 9 is a top perspective view taken generally in the direction of arrow 9 in FIG. 8, showing the seaweed sheet being inserted as in FIG. 7.
Figure 10:
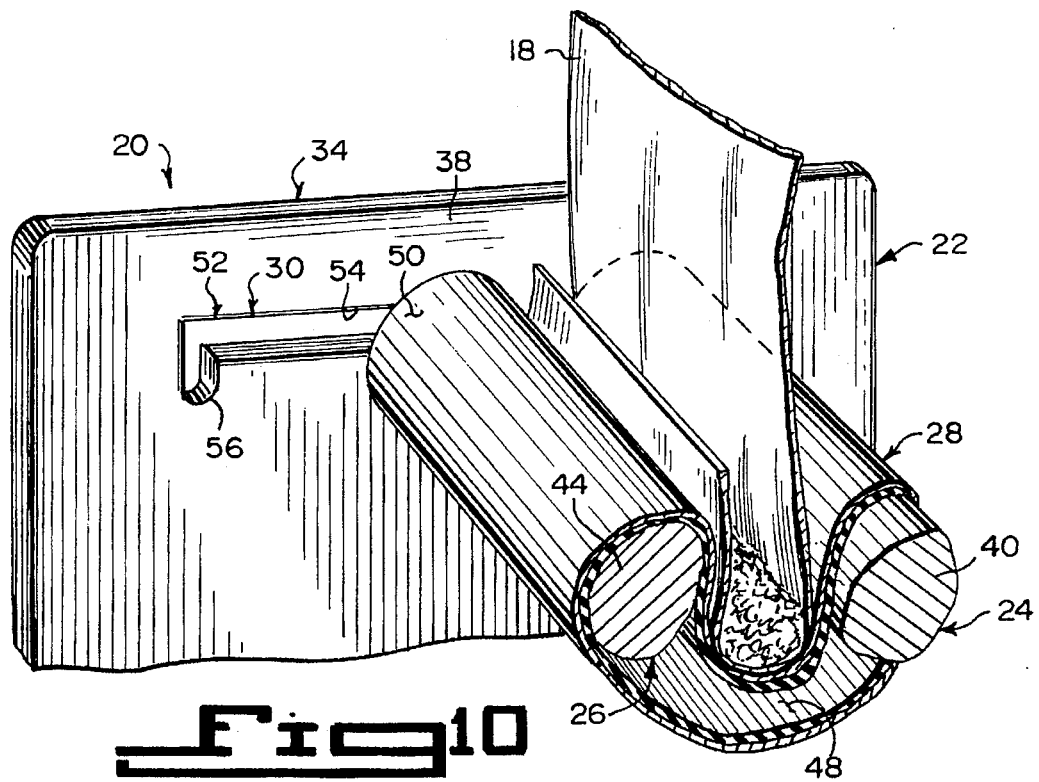
FIG. 10 is an enlarged cross sectional perspective view taken along line 10—10 in FIG. 9, showing in greater detail the seaweed sheet extending about the rolled up food filler on the endless belt.

Turning now descriptively to the drawings, in which similar reference characters denote similar elements throughout the several views, FIG. 1 illustrates a display stand 12 with cut up sushi rolls 14 therein. Each sushi roll 14, as best seen in FIG. 2, consists of a food filler 16, such as rice, seaweed and fish rolled in a seaweed sheet 18.

FIGS. 3 through 10 show the instant invention, which is an apparatus 20, for forming sushi rolls 14 comprising a housing 22. A drive roller 24 is rotatively carried within the housing 22. A driven roller 26 is rotatively carried within the housing 22 in a side by side relationship with the drive roller 24. An endless belt 28 is between the drive roller 24 and the driven roller 26. The endless belt 28 has an arcuate recess portion therebetween, that will receive the food filler 16 deposited upon the arcuate recess portion.

A facility 30 in the housing 22 for positioning the driven roller 26 closer to the drive roller 24, after the food filler 16 is placed upon the arcuate recess portion of the endless belt 28. A component 32 is for rotating the drive roller 24 with the endless belt 28 and the driven roller 26 together. When an edge of a seaweed sheet 18 is inserted into the arcuate recess portion of the endless belt 28, the seaweed sheet 18 will tightly wrap about the food filler 16 to form the sushi roll 14.

The housing 22 is a U-shaped bracket member 34. The U-shaped bracket member 34 includes a base 36 and a pair of upstanding end walls 38 on the base 36.

The drive roller 24 consists of a cylindrical drum 40 and a pair of stub shafts 42. Each stub shaft 42 extends from one end of the cylindrical drum 40 and fits in a rotatable manner into the housing 22.

The driven roller 26 includes a cylindrical drum 44 and a pair of stub shafts 46. Each stub shaft 46 extends from one end of the cylindrical drum 44 and fits in a rotatable manner into the housing 22.

The endless belt 28 contains an internal frictional surface 48, so as to prevent slippage on the drive roller 24 and the driven roller 26. An external nonstick surface 50 is also provided, so as to prevent the food filler 16 and the seaweed sheet 18 from sticking thereto.

The positioning facility 30 includes each upstanding end wall 38 of the U-shaped bracket member 34 having a shallow inverted U-shaped slot 52. A long portion 54 of the slot 52 extends horizontally thereacross. A short portion 56 of the slot 52 extends vertically down from each end of the long portion 54. The stub shafts 46 on the driven roller 26 can slide within the long portions 54 of the slots 52 and sit into either of the short portions 56 of the slots 52, so as to be near to as well as far from the driver roller 24.

The rotating component 32 is a crank handle 58, to engage with one stub shaft 42 on the drive roller 24. A person can grasp the crank handle 58 to manually rotate the drive roller 24.

As shown in FIGS. 3 and 5, elements 60 can be used for securing the base 36 to a horizontal support member 62, so as to prevent the U-shaped bracket member 34 from moving about. The securing elements 60 are a plurality of suction cups 64 affixed to the underside of the base 36. The suction cups 64 will stick to the horizontal support member 62.

LIST OF REFERENCE NUMBERS 12 display stand
14 sushi roll in 12
16 food filler of 14
18 seaweed sheet of 14
20 apparatus
22 housing of 20
24 drive roller of 20 in 22
26 driven roller of 20 in 22
28 endless belt of 20
30 positioning facility in 22
32 rotating component for 24 of 20
34 U-shaped bracket member for 22
36 base of 34
38 upstanding end wall of 34
40 cylindrical drum of 24
42 stub shaft on 40
44 cylindrical drum of 26
46 stub shaft on 44
48 internal frictional surface of 28
50 external nonstick surface of 28
52 shallow inverted U-shaped slot of 30
54 long portion of 52
56 short portion of 52
58 crank handle for 32
60 securing element on 36
62 horizontal support member
64 suction cup for 60

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for forming sushi rolls in which food filler is wrapped in seaweed sheet, comprising:

a) a housing comprising a U-shaped bracket member having a horizontal base and a pair of oppositely facing upstanding end walls;

b) a drive roller rotatively carried within said housing having a stub shaft at each end and supported for rotation between said upstanding walls in a fixed position;

c) a driven roller rotatively carried within said housing in a side by side relationship with said drive roller, each of said upstanding walls having an identical horizontally extending shallow inverted U-shaped slot, said driven roller having a stub shaft at each end extending into the slot in each upstanding end wall and slidable between the legs of said shallow inverted U-shaped slot, the first of said legs being adjacent to said drive roller and the second of said legs being spaced further from said drive roller;

d) an endless belt connected uninterruptedly between said drive roller and said driven roller, in which said endless belt having an arcuate recess portion therebetween, will receive a food filler deposited upon said arcuate recess portion when said driven roller is positioned with the stub shafts thereof in the second of said legs in said upstanding end walls, said belt having an internal frictional surface in contact with said rollers to prevent slippage and an external nonstick surface in contact with said food filler and seaweed sheet to prevent sticking to said endless belt;

e) said driven roller being moved closer to said drive roller after the food filler is placed upon said arcuate recess portion of said endless belt by sliding the stub shafts of said driven roller out of the second legs in said upstanding end walls along the horizontal portion of said U-shaped slot into the first legs of said slots;

f) means for rotating said drive roller, with the endless belt and said driven roller together, so that when an edge of a seaweed sheet is inserted into said arcuate recess portion of said endless belt, the seaweed sheet will tightly wrap about the food filler to form a sushi roll; and, g) means for securing said base to a horizontal support member for preventing said U-shaped bracket member from moving about.

2. An apparatus for forming sushi rolls as recited in claim 1, wherein said rotating means is a crank handle to engage with one a stub shaft on said drive roller, so that a person can grasp said crank handle to manually rotate said drive roller.

3. An apparatus for forming sushi rolls as recited in claim 1, wherein said securing means includes a plurality of suction cups affixed to the underside of said base, so that said suction cups will stick to the horizontal support member.

* * * * *